(12) United States Patent
Wang

(10) Patent No.: US 11,658,605 B2
(45) Date of Patent: May 23, 2023

(54) HYBRID SOLAR THERMAL AND PHOTOVOLTAIC POWER GENERATION SYSTEM WITH A PUMPED THERMAL STORAGE THROUGH A HEAT PUMP/HEAT ENGINE MODE SWITCHABLE APPARATUS

(71) Applicant: Yonghua Wang, Klamath Falls, OR (US)

(72) Inventor: Yonghua Wang, Klamath Falls, OR (US)

(73) Assignee: Yonghua Wang, Klamath Falls, OR (US)

(*) Notice: Subject to any disclaimer, the term of this patent is extended or adjusted under 35 U.S.C. 154(b) by 15 days.

(21) Appl. No.: 17/300,437

(22) Filed: Jun. 28, 2021

(65) Prior Publication Data

US 2022/0416714 A1    Dec. 29, 2022

(51) Int. Cl.
```
H02S 10/10      (2014.01)
H02S 40/44      (2014.01)
H02S 10/30      (2014.01)
H02S 10/20      (2014.01)
H02S 40/40      (2014.01)
```
(52) U.S. Cl.
CPC .............. *H02S 10/10* (2014.12); *H02S 10/30* (2014.12); *H02S 40/44* (2014.12); *H02S 10/20* (2014.12); *H02S 40/40* (2014.12); *Y02E 10/60* (2013.01)

(58) Field of Classification Search
CPC ....... H01L 31/00–078; Y02E 10/50–60; H02S 20/00–32; H02S 30/00–20; H02S 40/00–44; H02S 10/00–40
See application file for complete search history.

(56) References Cited

U.S. PATENT DOCUMENTS

| | | | | |
|---|---|---|---|---|
| 4,718,233 | A * | 1/1988 | Barrett | F03B 13/00 290/1 R |
| 2012/0167952 | A1* | 7/2012 | Yashiki | F22B 1/006 60/641.15 |
| 2017/0038103 | A1* | 2/2017 | Torrent | H02S 40/44 |
| 2019/0078808 | A1* | 3/2019 | Wang | F24S 10/90 |

\* cited by examiner

*Primary Examiner* — Bach T Dinh

(57) ABSTRACT

A hybrid solar thermal and photovoltaic power generation system with a pumped thermal storage system with a mode switchable heat pump/heat engine apparatus realizes utility scale stabilized power generation with low cost thermal storage, ultra-high conversion efficiency with hybrid solar thermal and photovoltaic cogeneration system, and low capital cost with the mode switchable heat pump/heat engine apparatus. The present system heat, cool, and supply power to buildings simultaneously over the four seasons. The synergistically combination of the hybrid solar thermal and photovoltaic cogeneration and the pumped thermal storage of the present invention is to make a transformative change of power supply landscape.

3 Claims, 4 Drawing Sheets

HYBRID SOLAR THERMAL AND PHOTOVOLTAIC POWER GENERATION SYSTEM WITH A PUMPED THERMAL STORAGE THROUGH A HEAT PUMP/HEAT ENGINE MODE SWITCHABLE APPARATUS

TECHNICAL FIELD

The present disclosure relates generally to hybrid solar thermal and photovoltaic power generation system with pumped thermal storage. More specifically, to hybrid solar thermal and photovoltaic panel based solar power generation system with a thermal storage system pumped by a mode switchable heat pump/heat engine system to raise temperature and subsequently generate power to realize stabilized power generation.

BACKGROUND

The world is undergoing the fundamental transition from the fossil fuel energy mode to renewable energy mode. The advances of renewable energy technologies such as photovoltaic technology are continuously changing the landscape of energy supply of the modern society. The Levelized Cost of Electricity (LCOE) of the photovoltaic generated power is approaching to the cost of the fossil fuel generated power. The widespread adoption of photovoltaic technology demonstrates a trend of complete replacement of fossil fuel. However, the total market penetration of photovoltaic technology is still limited to below 3.5% of total energy supply. The major obstacles that hampered the solar technology to be the main stream of power supply are its low efficiency and intermittence. Although various energy storage technologies have existed for decades, their costs for utility scale power generation are still prohibitively high. Some technologies such as pumped hydro have ever demonstrated desirable economic viability in utility scale energy storage, but they are constrained by geographical resource availability. Solar thermal power generation reveals to be the most ideal solution to address the intermittence issue of solar power generation due to its self contained thermal energy storage. However, the current solar thermal power generation stations only rely on direct solar radiation to generate power, therefore they are mainly constructed in dessert areas or some direct solar radiation rich areas. Their applications are limited not only by their cost-effectiveness, but also by their geographical locations. The flat-plate photovoltaic panel is increasingly demonstrating the most desirable cost-effectiveness, and the thermal energy storage has revealed appealing energy storage potential. The synergistically combination of flat plate photovoltaic panel, which is able to fully convert both direct radiation and diffuse radiation, and thermal power generation with thermal storage would be the breakthrough in utility scale solar power generation. The hybrid solar thermal and photovoltaic panels have not only demonstrated the ultra-high total conversion efficiency, but also presented an unparallel opportunity to combine the flat plate photovoltaic panels and pumped thermal energy storage to realize stabilized power generation in utility scale.

The present invention is to employ hybrid solar thermal and photovoltaic panels to cogenerate electricity and thermal energy with high total conversion efficiency, and transfer the cogenerated thermal energy to a thermal energy storage and raise the temperature of the thermal energy during the transferring process by deploying the mode switchable heat pump/heat engine system working at the heat pump mode, then subsequently take the stored thermal energy to generate power at nights or in the cloudy days by employing the mode switchable heat pump/heat engine system operating at the heat engine mode. The cogenerated electricity of the hybrid solar thermal and photovoltaic panels is deployed to power the heat pump during the temperature boosting process.

The component of hybrid solar thermal and photovoltaic panel of the present disclosure raises the total conversion efficiency over 70% and simultaneously cool down the photovoltaic part of the panel and significantly raise the photovoltaic conversion efficiency; makes full use of the both direct solar radiation and diffuse solar radiation and extends its feasibility to anywhere with sunny climate and cloudy climate; and cogenerate thermal energy for energy storage and subsequent power generation. The mode switchable heat pump/heat engine system of the present disclosure functions as heat transfer system, heat pump system, and thermal power generation system simultaneously and dramatically reduces the cost of equipment. The thermal storage such as molten salts extraordinarily reduces the cost of energy storage in a factor of 20-30 times lower than that of electrochemical energy storage. The configuration of the present invention system has the natural compatibility with the conventional flat plate photovoltaic panels. Hence, it is easy to integrate with conventional flat plate photovoltaic panel power generation systems to flexibly scale the entire system up and down. As an active energy storage system, the present invention can be deployed to balance other type renewable energy power generation system such as wind power generation.

Relative to the conventional solar thermal power generation system, which employs concentrating system to collect and convert sunlight, the system of the present invention relies on flat plate panel to collect and convert sunlight and has no moving parts, therefore has much high reliability and its cost effectiveness is not impacted by the system size. Furthermore, the system of the present invention does not intake the useful electric power from the power generation system for energy storage; it stores its cogenerated thermal energy and uses its cogenerated electric power to facilitate the energy storage.

US 2015/0260463 A1 invented by Robert B. Laughlin et al (Laughlin) disclosed a pumped thermal energy storage system. In Laughlin's disclosure, the pumped thermal energy storage system can store energy by operating as a heat pump, whereby net work input can be used to transfer heat from the cold side to the hot side; can extract energy by operating as a heat engine transferring heat from the hot side to the cold side, which can result in network output; can employ solar heating for improved storage efficiency. Although Laughlin's disclosure incorporates solar heating into the system to improve storage efficiency, it mainly stores the external electric energy through the heat pumping process, and extracts the stored energy through the thermal power generation process; it is mainly an energy storage system. In Laughlin's system, the compressor for the heat pumping process and the turbine for the power generation process are separated; the motor for driving the compressor and the generator for generating electric power are also separated. The apparatuses alternatively operate to store energy and retrieve energy having portion of the system in idling and therefore significantly increases the capital investment.

The present invention synergistically combines the hybrid solar thermal and photovoltaic panels with the pumped thermal energy storage system; enables the constructive interaction between the two components, the pumped thermal storage system enhance the photovoltaic performance by cooling the photovoltaic panel, the hybrid solar thermal and photovoltaic panels provide the cogenerated electricity and thermal energy for energy storage and power the pumped thermal storage system. Apparently, the synergistically combination of the hybrid solar thermal and photovoltaic panels and the pumped thermal energy storage significantly increase the efficiency, prominently reduce the cost, and effectively mitigate the intermittence of solar system. In the system configuration of the present invention, the compressor and the turbine are combined; and the motor and the generator are combined; the single entity apparatus operates alternatively by switching the modes as heat pump and heat engine.

Objects and Advantages

The objects of the present invention are to dramatically increase the total conversion efficiency of the solar system by cogenerating electricity and heat through hybrid solar thermal and photovoltaic panels; store the cogenerated heat to smooth the intermittence of the solar system; employ the pumped thermal storage to increase the effectiveness and decrease the cost of the thermal storage system through the adoption of the heat pump/heat engine mode switchable apparatus; and employ the cogenerated electricity to power the pumped thermal storage to store the cogenerated electric energy.

Relative to the conventional power generation and energy storage systems such as flat plate photovoltaic panels plus electrochemical energy storage, and solar thermal power generation system, the present invention cogenerates electricity and heat and store the cogenerated heat to store energy; has no moving parts; therefore has ultra-high total conversion efficiency, relatively low cost, and super-high reliability. The present invention has no geographical limitation and enjoys wide feasibility to any climate characteristics. It is compatible to any other systems either as active energy storage system or power generation and energy storage system. It can be easily integrated into buildings or built up as independent systems such as electric vehicle charging station. It provides the foundation to construct the full renewable energy supported power grid with economic viability.

SUMMARY

Fixed mounted flat plate photovoltaic panel dominates the solar market as the most fundamental solar conversion module due to its simplicity, reliability, feasibility and increasing affordability. The present invention adopts the modified version of flat plate photovoltaic panel hybrid solar thermal and photovoltaic panel to raise the total conversion efficiency of solar system, and improve its photovoltaic performance by cooling the photovoltaic portion of the hybrid panel. In the present disclosure, a pumped thermal energy storage system is integrated with the hybrid solar thermal and photovoltaic panel system to pump and store the cogenerated thermal energy into a thermal energy storage system through a heat pump/heat engine mode switchable apparatus working at heat pump mode; when in cloudy days or at nights, the stored thermal energy is extracted and converted back to electric power through the apparatus operating at heat engine mode.

Relative to the electrochemical energy storage, the present invention adopts thermal storage, which is 20-30 time cheaper than battery, to store energy. Comparing with the conventional solar thermal power generation system, the present invention takes the fixed mounted flat plate type solar collector and converter, which is capable of collecting and converting both direct and diffuse solar radiation, to collect and convert sunlight, and demonstrated much high reliability with a much simpler system structure. Instead of storing the electric power, the present invention store the cogenerated thermal energy and use the cogenerated electric power to drive the heat pump/heat engine apparatus working at heat pump mode to pump the cogenerated thermal energy to high temperature. Consequently, a part of cogenerated electric power is also stored into the thermal storage system. By switching the modes, the heat pump/heat engine apparatus is employed alternately to pump the cogenerated heat and transform the stored heat so as to maximize its utilization factor and dramatically reduce the capital cost of equipment. The present invention synergistically combine the power generation and energy storage together to realize utility scale stabilized power generation without consuming chemicals or other materials. The present invention is not limited by any geographical conditions.

BRIEF DESCRIPTION OF THE DRAWINGS

The accompanying drawings, which are incorporated in and constitute a part of this specification, illustrate an embodiment of the invention and together with the description, serve to explain the principles of the invention.

DETAILED DESCRIPTION

Reference will now be made in detail to the present exemplary embodiment, example of which is illustrated in the accompanying drawings. Wherever possible, the same reference numbers will be used throughout the drawings to refer to the same or like parts.

Figure 1:
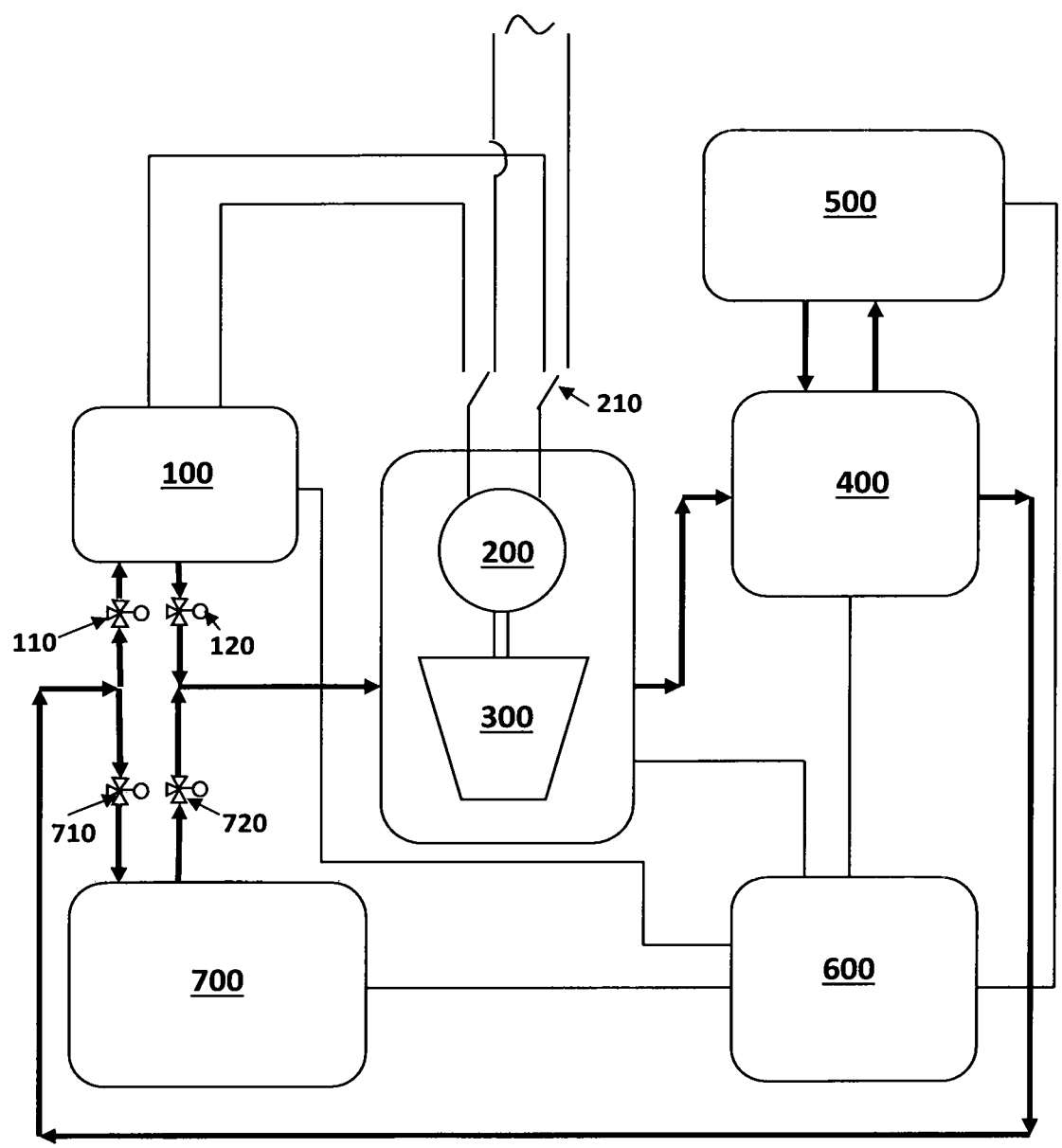
FIG. 1 is the schematic configuration of the hybrid solar thermal and photovoltaic power generation system with a pumped thermal storage system through a mode switchable heat pump/heat engine apparatus.

Referring to FIG. 1, the hybrid solar thermal and photovoltaic power generation system with a pumped thermal storage system with the mode switchable heat pump/heat engine apparatus of the present invention comprises: a hybrid solar thermal and photovoltaic panel array 100; mode switchable motor/generator 200; mode switchable compressor/turbine 300; heat exchanger 400; thermal storage 500; control system 600; heat exchanger 700. The photovoltaic part of the hybrid solar thermal and photovoltaic panel array 100 is connected to the motor/generator 200 through the switchers 210, and the thermal portion of the hybrid solar thermal and photovoltaic array 100 and the heat exchanger 700 are connected to the compressor/turbine 300 through the automatic controlled valves 110, 120, 710, 720. During daytime, the hybrid solar thermal and photovoltaic array 100 cogenerate electricity and heat; the cogenerated heat is extracted and transferred to the thermal storage 500 through the compressor/turbine apparatus working at the compressor mode and the heat exchanger 400, during this process the temperature of the cogenerated heat is raised; the heat in building rooms or other spaces that need cooling is also extracted, transferred and raised in temperature together with the cogenerated heat to the thermal storage 500, and consequently cool down the building rooms and other spaces. At nights or during the cloudy days, the stored heat in the thermal storage 500 is released through the heat exchanger 400 to drive the heat pump/turbine 300 working at turbine mode to generate electric power through the motor/generator 200 operating at the generator mode.

Figure 2:
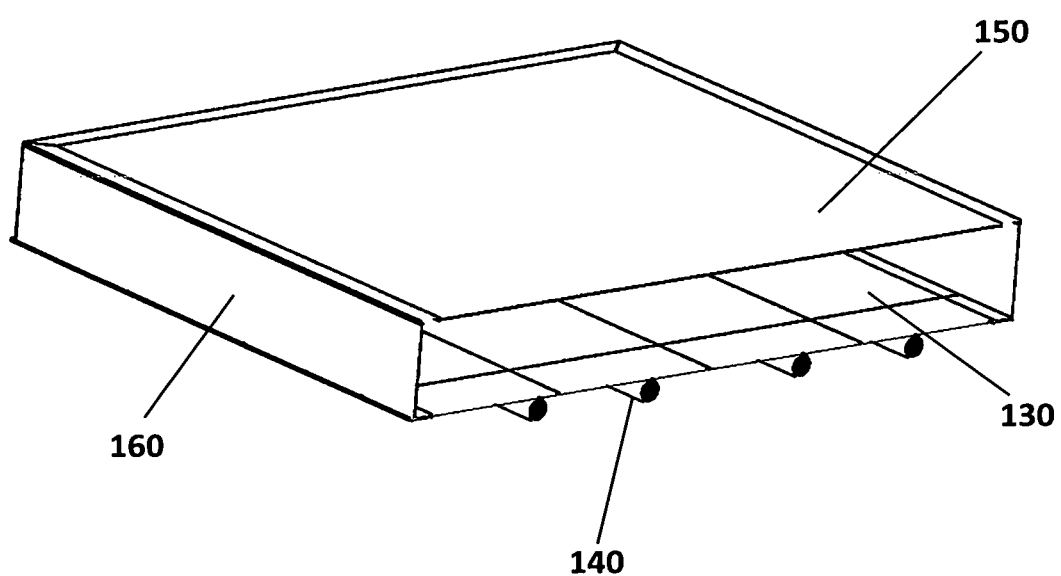
FIG. 2 is the cross section view of the hybrid solar thermal and photovoltaic panel.

Referring to FIG. 2, the hybrid solar thermal and photovoltaic panel is assembled with frame 160, photovoltaic panel 130, fin pipe thermal collector 140, and transparent cover 150. Portion of the incident sunlight that penetrates through the transparent cover 150 and arrives at the surface of the photovoltaic panel 130 is converted into electricity; the rest part of the incident sunlight is converted into heat and extracted by the thermal collector 140.

Figure 3:
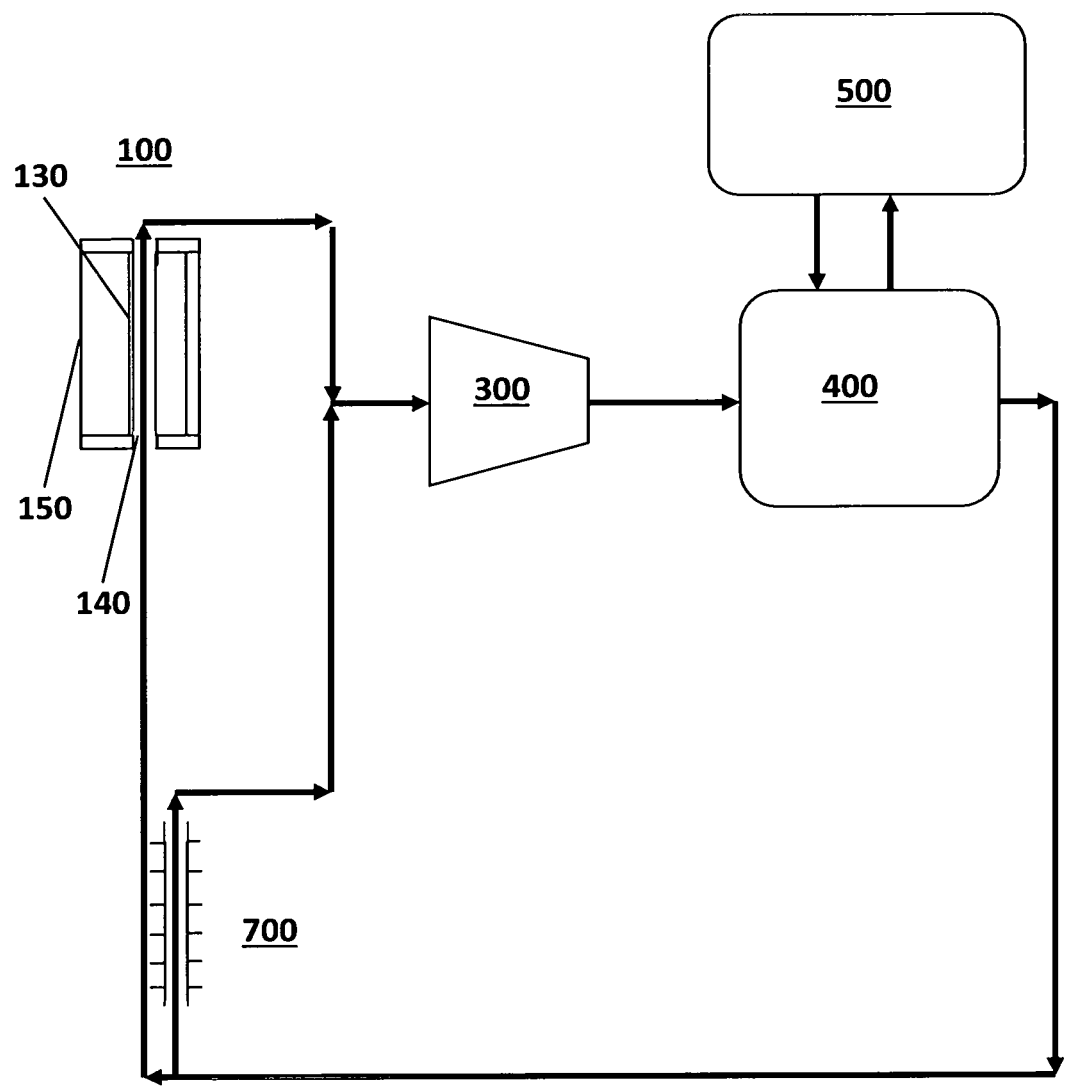
FIG. 3 is the indication of the fluid flow and heat transfer in the process of pumping thermal energy storage at the heat pump mode of the heat pump/heat engine apparatus.

Referring to FIG. 3, the heat cogenerated by the hybrid solar thermal and photovoltaic array 100 and the heat in building rooms or other spaces are extracted and transferred to the thermal storage 500 through the thermal collector 140 and heat exchanger 700. During this process, the temperature of the heat is raised through the heat pump/heat engine 300 and heat exchanger 400.

Figure 4:
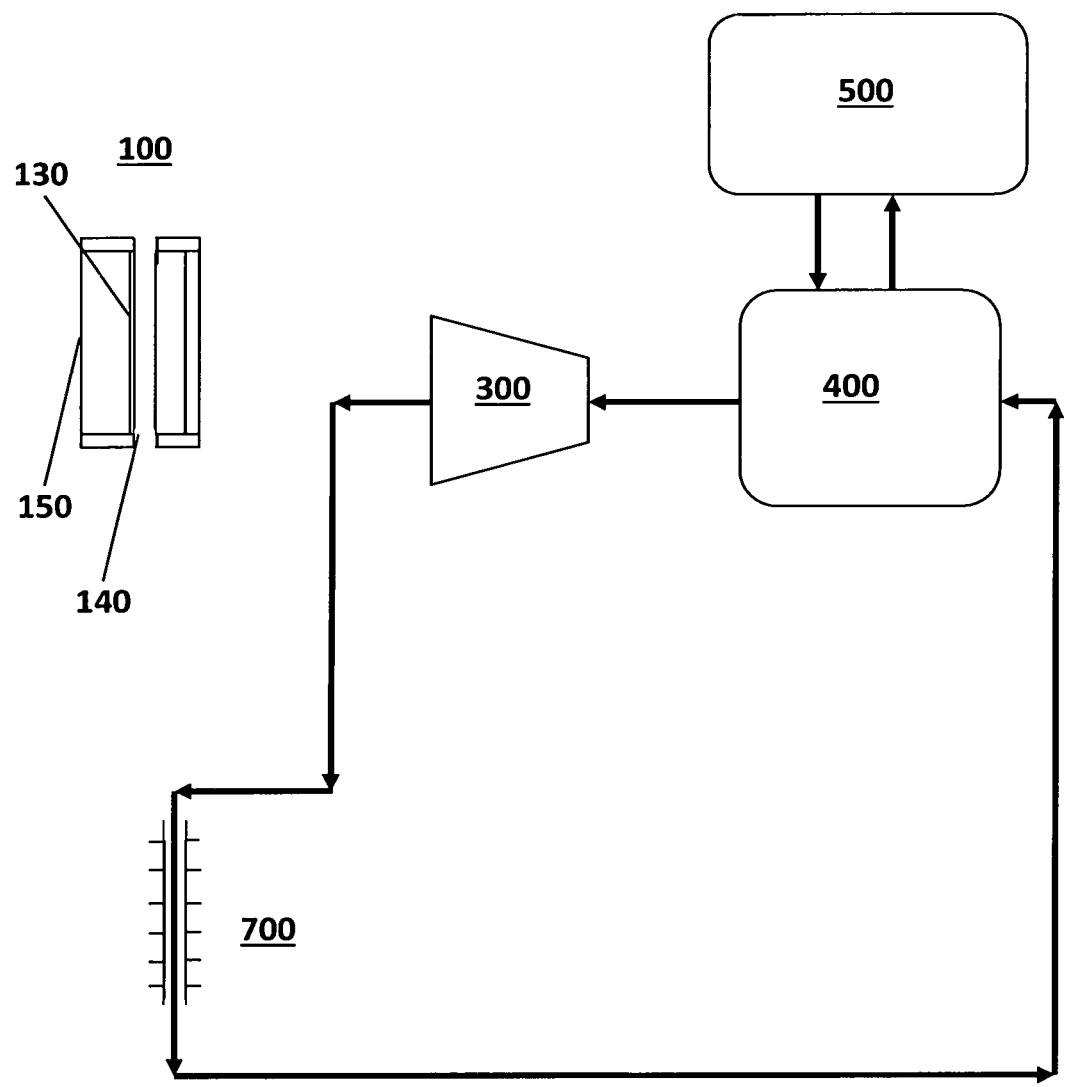
FIG. 4 is the indication of the fluid flow and heat transfer in the process of power generation at the heat engine mode of the heat pump/heat engine apparatus.

Referring to FIG. 4, the stored heat in thermal storage 500 is released to drive the compressor/turbine 300 operating at turbine mode to generate power through the heat exchanger 400 and the motor/generator 200 working at the generator mode. The low temperature heat is released through the heat exchanger 700.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. The specification and drawings are accordingly to be regarded in an illustrative rather than restrictive sense.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. A hybrid solar thermal and photovoltaic power generation system with a pumped thermal energy storage system with a mode switchable heat pump/heat engine apparatus comprising:
   a. a hybrid solar thermal and photovoltaic panel array;
   b. a mode switchable heat pump/heat engine apparatus comprising: a mode switchable motor/generator apparatus and a mode switchable compressor/turbine apparatus; the motor/generator apparatus is connected with the compressor/turbine apparatus through one shaft;
   c. a high temperature heat exchanger;
   d. a thermal storage system;
   e. a low temperature heat exchanger;
   f. a control system;

wherein, the photovoltaic portion of the hybrid solar thermal and photovoltaic array is electrically connected to the mode switchable motor/generator apparatus through a switcher system; the thermal portion of the hybrid solar thermal and photovoltaic panel array is connected to the mode switchable compressor/turbine apparatus through pipes, pumps, and automatic controlled valves; the mode switchable compressor/turbine apparatus is connected to the high temperature heat exchanger through pipes, pumps, and valves; the high temperature heat exchangers is connected to both the thermal storage system and the low temperature heat exchanger through pipes, and automatic controlled valves; the low temperature heat exchanger is connected both to the mode switchable compressor/turbine and thermal portion of the hybrid solar thermal and photovoltaic panel array through pipes, and automatic controlled valves.

2. The hybrid solar thermal and photovoltaic power generation system with a pumped thermal energy storage system with a mode switchable heat pump/heat engine apparatus of claim 1, wherein, both or single of each of the thermal portion of the hybrid solar thermal and photovoltaic panel array and the low temperature heat exchanger, are alternatively connected to the mode switchable compressor/turbine through the combination of automatic controlled valves.

3. The hybrid solar thermal and photovoltaic power generation system with a pumped thermal energy storage system with a mode switchable heat pump/heat engine apparatus of claim 1, wherein, the mode switchable motor/generator apparatus, is alternatively connected to the photovoltaic portion of the hybrid solar thermal and photovoltaic panel array and a power output circuit through a two position switchers.

* * * * *